United States Patent
Kamiyama et al.

(10) Patent No.: US 11,046,111 B2
(45) Date of Patent: Jun. 29, 2021

(54) VEHICLE WHEEL

(71) Applicant: HONDA MOTOR CO., LTD., Tokyo (JP)

(72) Inventors: Youichi Kamiyama, Wako (JP); Katsushi Ishii, Wako (JP); Jung-Un Park, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 276 days.

(21) Appl. No.: 16/085,129

(22) PCT Filed: Mar. 16, 2017

(86) PCT No.: PCT/JP2017/010800
§ 371 (c)(1),
(2) Date: Sep. 14, 2018

(87) PCT Pub. No.: WO2017/159830
PCT Pub. Date: Sep. 21, 2017

(65) Prior Publication Data
US 2019/0077190 A1    Mar. 14, 2019

(30) Foreign Application Priority Data
Mar. 16, 2016  (JP) .............................. JP2016-052013

(51) Int. Cl.
*B60B 21/12*  (2006.01)
*B60B 21/02*  (2006.01)

(52) U.S. Cl.
CPC .............. *B60B 21/12* (2013.01); *B60B 21/02* (2013.01); *B60B 21/026* (2013.01); *B60B 2900/133* (2013.01)

(58) Field of Classification Search
CPC .............................. B60B 23/12; B60C 19/002
See application file for complete search history.

(56) References Cited

U.S. PATENT DOCUMENTS 7,690,410 B2 * 4/2010 Kamiyama ........... B60B 21/026
152/381.5
7,896,044 B2 * 3/2011 Kashiwai ................ B60B 21/12
152/381.6

(Continued)

FOREIGN PATENT DOCUMENTS

JP    2009-051304 A    3/2009
JP    2009-107357 A    5/2009

(Continued)

OTHER PUBLICATIONS

International Search Report by ISA/JP dated Jun. 13, 2017, on PCT/JP2017/010800 (4 pages).

(Continued)

*Primary Examiner* — Jason R Bellinger
(74) *Attorney, Agent, or Firm* — Rankin, Hill & Clark LLP

(57) ABSTRACT

An auxiliary air chamber member includes: a lower surface arranged on the outer circumferential surface side of a well section; an upper surface arranged outward from the lower surface; an auxiliary air chamber formed between the upper surface and the lower surface; a pair of edges that join the lower surface and the upper surface on both sides in the width direction and that engage with the well section; and a plurality of joining sections that partially join the upper surface and the lower surface as a result of being sunk into the interior of the auxiliary air chamber from the upper surface and the lower surface between one edge and the other edge along the wheel width direction Y. The joining points of the individual joining sections are arranged on the strong axis of the cross-sectional main axis of the auxiliary air chamber member in an axial right section.

3 Claims, 6 Drawing Sheets

(56) References Cited

U.S. PATENT DOCUMENTS

| | | | |
|---|---|---|---|
| 8,181,685 B2* | 5/2012 | Kamiyama | B60B 1/08 |
| | | | 152/381.5 |
| 10,131,190 B2* | 11/2018 | Kamiyama | B60B 21/026 |
| 10,532,616 B2* | 1/2020 | Kamiyama | B60C 19/002 |
| 10,562,346 B2* | 2/2020 | Kamiyama | B60B 21/02 |
| 2014/0346842 A1 | 11/2014 | Kamiyama et al. | |
| 2018/0022151 A1 | 1/2018 | Kamiyama | |
| 2019/0389248 A1* | 12/2019 | Inaba | B60B 21/026 |
| 2020/0009923 A1* | 1/2020 | Kamiyama | B60B 21/026 |
| 2020/0023683 A1* | 1/2020 | Kamiyama | B60B 21/12 |
| 2020/0070572 A1* | 3/2020 | Saito | B60C 19/002 |
| 2020/0101801 A1* | 4/2020 | Kamiyama | B60B 21/12 |
| 2020/0130409 A1* | 4/2020 | Kamiyama | B60B 21/12 |
| 2020/0130410 A1* | 4/2020 | Kamiyama | G10K 11/172 |
| 2020/0148000 A1* | 5/2020 | Shin | B60B 21/12 |

FOREIGN PATENT DOCUMENTS

| | | |
|---|---|---|
| JP | 2014-226992 A | 12/2014 |
| JP | 2015-058853 A | 3/2015 |
| JP | 2015-174495 A | 10/2015 |
| JP | 2015-174502 A | 10/2015 |
| JP | 2015-174503 A | 10/2015 |
| WO | 2016143533 A1 | 9/2016 |

OTHER PUBLICATIONS

Written Opinion by ISA/JP dated Jun. 13, 2017, on PCT/JP2017/010800 (5 pages).

* cited by examiner (COMPARATIVE EXAMPLE 1) (PRIOR ART)

(COMPARATIVE EXAMPLE 2) (PRIOR ART)

(PRESENT EMBODIMENT)

VEHICLE WHEEL

TECHNICAL FIELD

The present invention relates to a vehicle wheel.

BACKGROUND ART

To reduce road noise caused by pipe resonance in a tire air chamber, various wheels have been conventionally proposed which are provided with Helmholtz resonators (sub-air chamber members) each having a sub-air chamber that communicates with the tire air chamber via a communication hole.

The sub-air chamber member includes a main body part which has a sub-air chamber inside and which is formed long in the wheel circumferential direction (see, for example, Patent Literature 1). On the upper surface side of the main body part, a plurality of upper projecting portions recessed toward the lower surface side are formed. On the lower surface side of the main body portion, a plurality of lower projecting portions are formed at positions coinciding with the upper projecting portions and are recessed toward the upper side. Corresponding upper projecting portions and lower projecting portions are joined to each other at their bottom portions. The upper projecting portions or the lower projecting portions are arranged in two lines extending in the wheel circumferential direction.

CITATION LIST

Patent Literature

Patent Literature 1: Japanese Patent Application Publication No. 2015-174495

SUMMARY OF INVENTION

Technical Problem

When centrifugal force acts on the sub-air chamber member due to the rotational movement of the wheel, the maximum stress is generated at the sites where the upper projecting portions and the lower projecting portions are joined to each other, and problematically, stress tends to concentrate at those joint sites.

A general object of the present invention is to provide a vehicle wheel capable of favorably avoiding stress concentration at joint portions in a sub-air chamber member.

Solution to Problem

To achieve the above object, the present invention is a vehicle wheel having a sub-air chamber member as a Helmholtz resonator attached to an outer circumferential surface of a well portion, characterized in that: the sub-air chamber member comprises a lower surface portion disposed at the outer circumferential surface side of the well portion, an upper surface portion disposed radially outward of the lower surface portion, a sub-air chamber formed between the upper surface portion and the lower surface portion, a first edge portion and a second edge portion that connect the lower surface portion and the upper surface portion to each other at respective two sides in a width direction and engage with the well portion, and a plurality of joint portions that join the upper surface portion and the lower surface portion to each other partially by being recessed toward an inside of the sub-air chamber from the upper surface portion and the lower surface portion between the first edge portion and the second edge portion in the wheel width direction; and on an axially perpendicular section of the sub-air chamber member, joint points (C1, C2) of the joint portions are disposed on a strong axis (PA1) of principal axes of the section.

According to the present invention, the joint points (C1, C2) of the joint portions are situated on the strong axis (PA1) of the principal axes of an axially perpendicular section of the sub-air chamber member, thereby eliminating concentration of stress inside the sub-air chamber. Thus, strength and durability against the maximum centrifugal force can be improved. Further, since the surface rigidity of the upper surface portion improves, sound deadening performance can improve. The present invention can thus achieve balance between durability performance and sound deadening performance and improve both of these performances.

In addition, the prevent invention is a vehicle wheel having a sub-air chamber member as a Helmholtz resonator attached to an outer circumferential surface of a well portion, characterized in that: the sub-air chamber member comprises a lower surface portion disposed at the outer circumferential surface side of the well portion, an upper surface portion disposed radially outward of the lower surface portion, a sub-air chamber formed between the upper surface portion and the lower surface portion, a first edge portion and a second edge portion that connect the lower surface portion and the upper surface portion to each other at respective sides in a width direction and engage with the well portion, and a plurality of joint portions that join the upper surface portion and the lower surface portion to each other partially by being recessed toward an inside of the sub-air chamber from the upper surface portion and the lower surface portion between the first edge portion and the second edge portion in the wheel width direction; and on an axially perpendicular section of the sub-air chamber member, a gap distance from the joint points of the joint portions to a strong axis (PA1) of principal axes of the section is shorter than a gap distance from the lower surface portion to the joint points of the joint portions.

According to the present invention, the joint points (C1, C2) of the joint portions are situated closer to the strong axis (PA1) of the principal axes of a section than to the lower surface portion. Thus, the present invention can favorably avoid concentration of stress at the joint portions.

In addition, the present invention is a vehicle wheel having a sub-air chamber member as a Helmholtz resonator attached to an outer circumferential surface of a well portion, characterized in that: the sub-air chamber member comprises a lower surface portion disposed at the outer circumferential surface side of the well portion, an upper surface portion disposed radially outward of the lower surface portion, a sub-air chamber formed between the upper surface portion and the lower surface portion, a first edge portion and a second edge portion that connect the lower surface portion and the upper surface portion to each other at respective sides in a width direction and engage with the well portion, and a plurality of joint portions that join the upper surface portion and the lower surface portion to each other partially by being recessed toward an inside of the sub-air chamber from the upper surface portion and the lower surface portion between the first edge portion and the second edge portion in the wheel width direction; and a product of a mass of the upper surface portion including the joint portions between the first edge portion and the second edge portion and a distance in a radius direction from a center of a tire to a barycenter of an axially perpendicular section of the sub-air chamber member is substantially the same as a product of amass of the lower surface portion including the joint portions between the first edge portion to the second edge portion and the distance in the radius direction from the center of the tire to the barycenter of the axially perpendicular section.

According to the present invention, the distribution of mass of the upper surface portion including the joint portions with respect to centrifugal force is substantially the same as that of the lower surface portion including the joint portions with respect to centrifugal force, so that centrifugal forces produced on the upper surface portion and the lower surface portion when centrifugal force acts on the sub-air chamber are substantially the same. As a result, the amounts of displacement of the upper surface portion and the lower surface portion due to the centrifugal force produced are substantially the same, and the present invention can reduce stress produced on the joint portions and avoid stress concentration.

Advantageous Effects of Invention

The present invention can obtain a vehicle wheel capable of favorably avoiding stress concentration at the joint portions in the sub-air chamber member.

DESCRIPTION OF EMBODIMENTS

Figure 1:
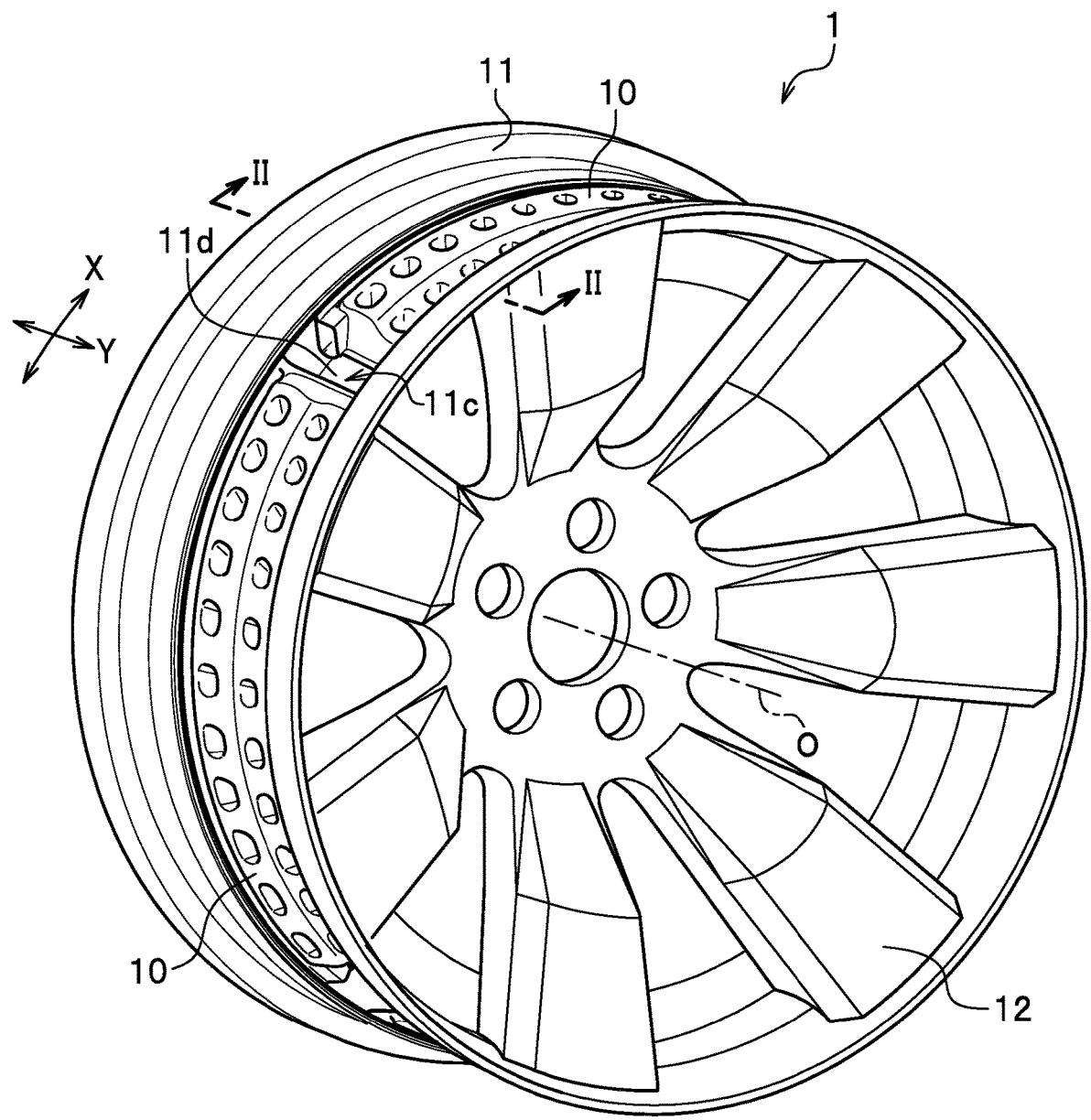
FIG. 1 is a perspective view of a vehicle wheel according to a first embodiment of the present invention.

Next, embodiments of the present invention are described in detail with reference to the drawings where necessary. FIG. 1 is a perspective view of a vehicle wheel according to a first embodiment of the present invention. Throughout the drawings, "X" indicates the wheel circumferential direction, "Y" indicates the wheel width direction, and "Z" indicates the wheel radial direction.

As illustrated in FIG. 1, a vehicle wheel 1 according to the present embodiment has a plurality of sub-air chamber members 10 as Helmholtz resonators, the sub-air chamber members 10 being away from each other at equal intervals in the wheel circumferential direction X. In the present embodiment, it is assumed that four sub-air chamber members 10 are arranged in the wheel circumferential direction X of the vehicle wheel 1. Note that the center axis O in FIG. 1 indicates the center of a tire (not shown).

The vehicle wheel 1 includes a rim 11 and a disk 12 that links the rim 11 to a hub (not shown). The sub-air chamber members 10 are attached by being fitted onto the outer circumferential surface 11d of a well portion 11c of the rim 11.

Figure 2:
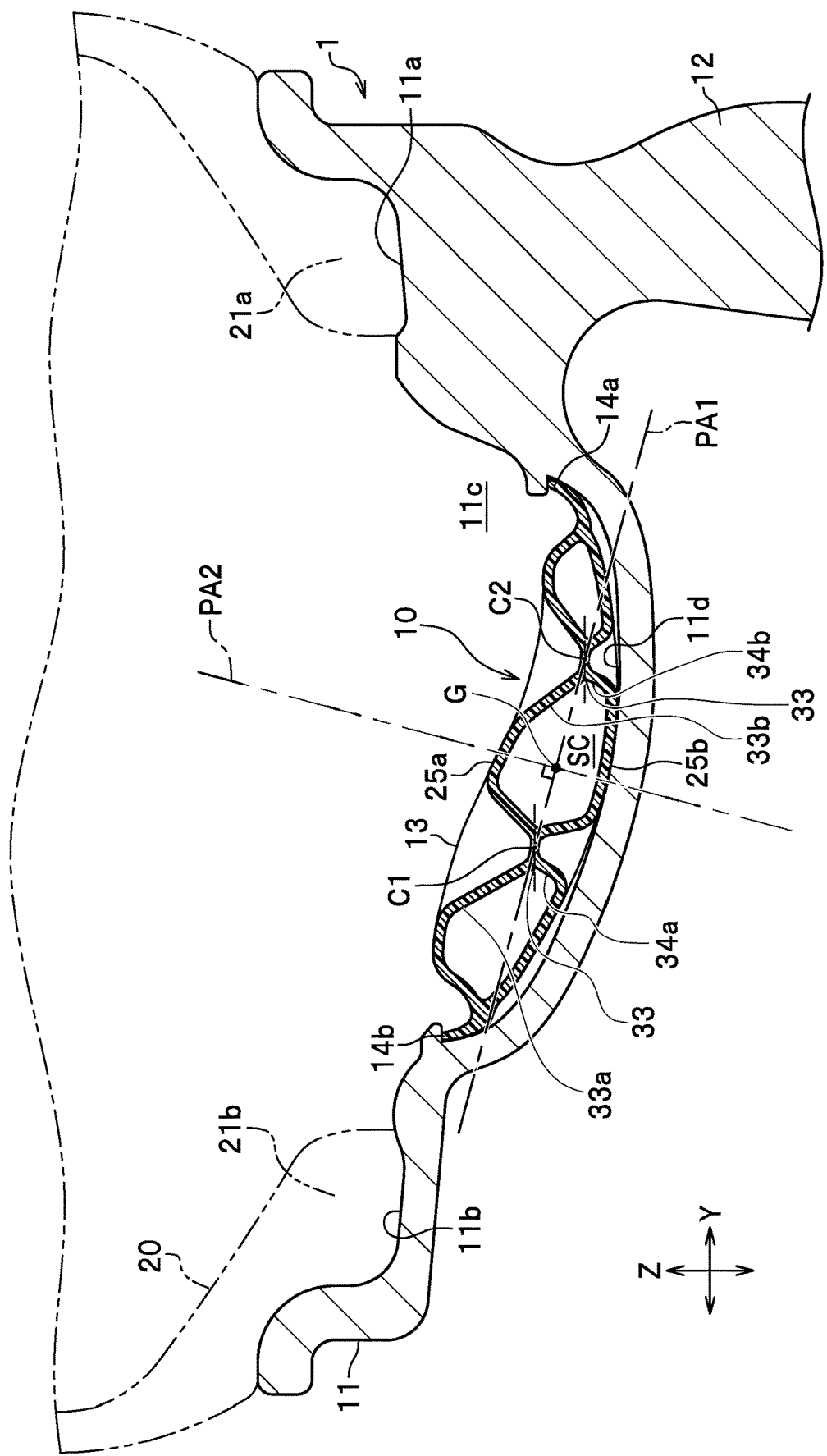
FIG. 2 is a partially enlarged, longitudinal sectional view taken along the line II-II in FIG. 1.
Figure 3:
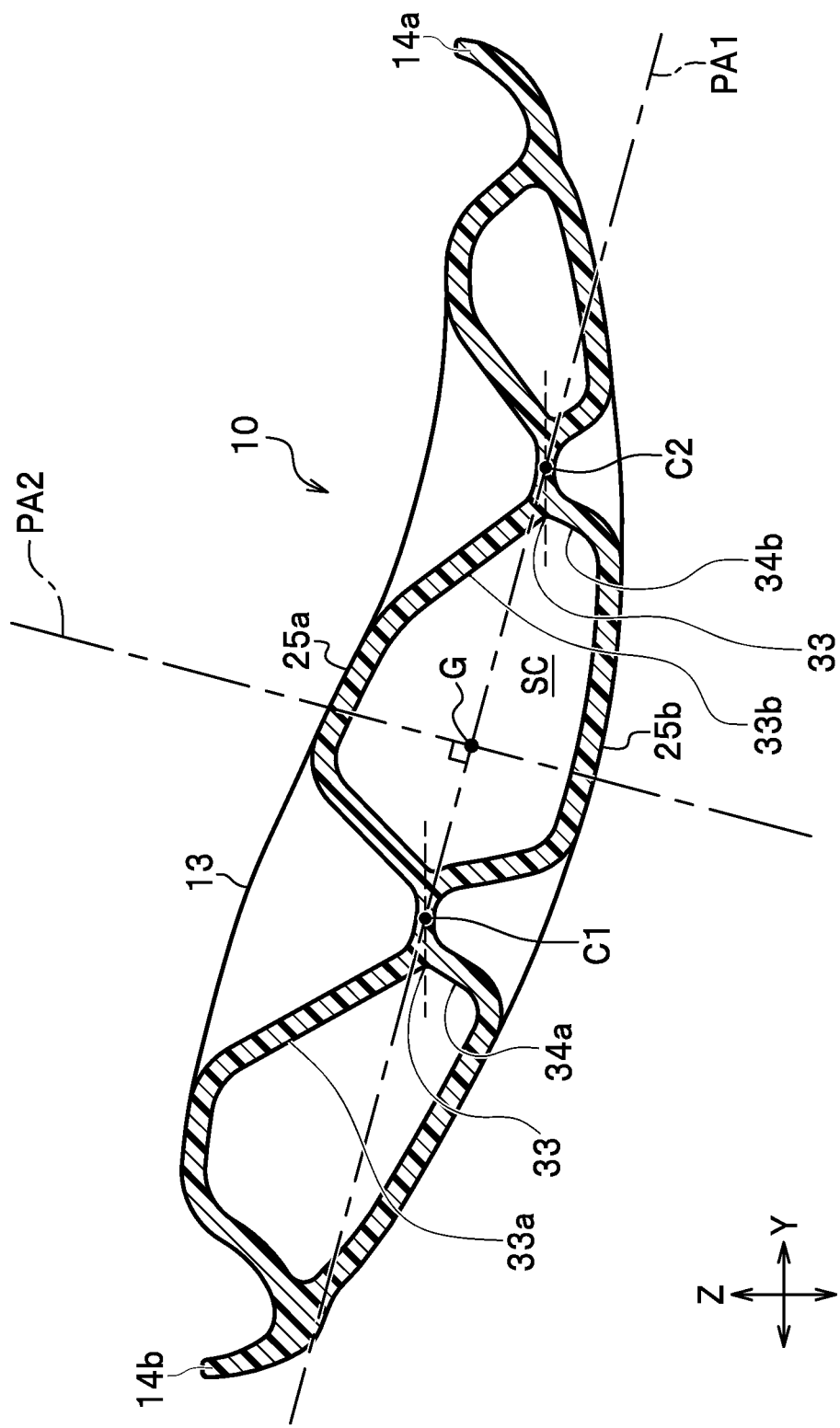
FIG. 3 is a partially enlarged, longitudinal sectional view of FIG. 2.

FIG. 2 is a partially enlarged, longitudinal sectional view taken along the line II-II in FIG. 1, and FIG. 3 is a partially enlarged, longitudinal sectional view of FIG. 2.

As illustrated in FIG. 2, the rim 11 has the well portion 11c between bead seats 11a, 11b which are formed at respective edge portions thereof in the wheel width direction Y, the well portion 11c being recessed inward in the wheel radial direction Z (toward the rotation center).

The well portion 11c is provided to allow bead portion 21a, 21b of a tire 20 to be seated into the rim 11 when the tire 20 is mounted to the rim 11.

As illustrated in FIG. 2, each sub-air chamber member 10 is a member long in one direction (see FIG. 1) and includes a hollow main body portion 13 having a sub-air chamber SC to be described later inside, and a pair of edge portions (a first edge portion, a second edge portion) 14a, 14b. The pair of edge portions 14a, 14b locks the sub-air chamber member 10 in the well portion 11c.

The sub-air chamber member 10 curves in its longitudinal direction and is configured to lie along the wheel circumferential direction X when attached to the outer circumferential surface 11d of the well portion 11c (see FIG. 1). The main body portion 13 has a tubular body (not shown) at an end portion in its longitudinal direction (i.e., the wheel circumferential direction X), and a communication hole (not shown) communicating with the sub-air chamber SC is formed inside the tubular body.

The sub-air chamber member 10 has a long rectangular shape in a plan view. As shown in FIGS. 2 and 3, the main body portion 13 of the sub-air chamber member 10 has a lower surface portion 25b which is a bottom plate disposed to lie along the outer circumferential surface 11d side of the well portion 11c (see FIG. 1) and is formed of a curved surface recessed inward in the wheel radial direction Z in a sectional view taken in the wheel width direction Y. Note that the outer circumferential surface 11d of the well portion 11c is, as illustrated in FIG. 2, formed of a curved surface recessed inward in the wheel radial direction Z in a sectional view taken in the wheel width direction Y, like the lower surface portion 25b.

The main body portion 13 further includes: an upper surface portion 25a which is an upper plate disposed radially outward of the lower surface portion 25b and facing the lower surface portion 25b; and the sub-air chamber SC formed between the upper surface portion 25a and the lower surface portion 25b. Although the resin material forming the upper surface portion 25a and the lower surface portion 25b have the same thickness in the present embodiment, their thicknesses may be different from each other.

The main body portion 13 of the sub-air chamber member 10 further includes: the first edge portion 14a and the second edge portion 14b that link the lower surface portion 25b and the upper surface portion 25a to each other at respective sides in the width direction and engage with the well portion 11c; and a plurality of joint portions 33 that partially join the upper surface portion 25a and the lower surface portion 25b to each other by being recessed from the upper surface portion 25a and the lower surface portion 25b to the inside of the sub-air chamber SC.

The upper surface portion 25a is situated above the lower surface portion 25b disposed along the outer circumferential surface 11d side of the well portion 11c and is curved in a swelling manner, thereby forming the sub-air chamber SC. The communication hole in the tubular body (not shown) disposed at the end portion of the main body portion 13 in the wheel circumferential direction X communicates with the sub-air chamber SC at one end side in the wheel circumferential direction X and is open to the outside at the other end side.

As illustrated in FIGS. 2 and 3, pairs of upper projecting portions 33a, 33b are formed in the wheel width direction Y in a part of the upper surface portion 25a forming the main body portion 13. Each pair of the upper projecting portions 33a, 33b is formed by the upper projecting portion 33a at an inner side in the wheel width direction Y and the upper projecting portion 33b at an outer side in the wheel width direction Y. These paired upper projecting portions 33a, 33b are portions of the upper surface portion 25a being recessed toward the lower surface portion 25b, and are circular in a plan view. The pairs of the upper projecting portions 33a, 33b are arranged in two lines side by side in the width direction of the main body portion 13, the two lines running in the longitudinal direction of the sub-air chamber member 10 (i.e., the wheel circumferential direction X).

Pairs of lower projecting portions 34a, 34b are formed at positions on the lower surface portion 25b that coincide with the pairs of the upper projecting portions 33a, 33b. Between the upper projecting portions 33a, 33b and the lower projecting portions 34a, 34b, the joint portions 33 are situated, connecting the upper projecting portions 33a, 33b and the lower projecting portions 34a, 34b to each other. The lower projecting portions 34a, 34b are portions of the lower surface portion 25b being recessed toward the upper surface portion 25a, and are circular in a bottom view. Tip end portions of the lower projecting portions 34a, 34b unite with tip end portions of the upper projecting portions 33a, 33b of the upper surface portion 25a, thereby joining the upper surface portion 25a and the lower surface portion 25b to each other partially.

In other words, the upper surface portion 25a and the lower surface portion 25b are joined together partially through the upper projecting portions 33a, 33b and the lower projecting portions 34a, 34b joined to each other at their bottom portions. Joint points C1, C2 of the joint portions 33 are provided at the sites where the upper projecting portions 33a, 33b are joined to the lower projecting portions 34a, 34b.

Note that the upper projecting portions 33a and the lower projecting portions 34a disposed at an inner side in the wheel width direction Y are taller in the wheel radial direction Z than the upper projecting portions 33b and the lower projecting portions 34b disposed at an outer side in the wheel width direction Y.

The upper projecting portions 33a, 33b and the lower projecting portions 34a, 34b joined to each other inside the sub-air chamber SC improve the mechanical strength of the sub-air chamber member 10 and reduce variation in the volume of the sub-air chamber SC to produce a sound deadening function.

On the lower surface portion side (the inner side in the wheel radial direction Z) of the main body portion 13, beads (what is called transverse beads) (not shown) are formed, extending in the wheel width direction Y and partially recessing the lower surface portion 25b toward the upper surface portion 25a. The surface rigidity of the lower surface portion 25b is enhanced by these beads formed at a plurality of locations in directions to link the inner lower projecting portions 33b and the outer lower projecting portions 34b.

The joint points C1, C2 between the upper projecting portions 33a, 33b and the lower projecting portions 34a, 34b forming the joint portions 33 are disposed on a principal axis of a section. "Principal axes of a section" refer to a pair of two orthogonal axes which pass through the centroid (barycenter) G of a section and have the maximum and minimum second moments of area, respectively, with respect to the axes. This pair of axes includes a strong axis PA1 and a weak axis PA2 having the maximum second moment of area and the minimum second moment of area, respectively, on a section orthogonal to the centroid G of the section (an axially perpendicular section). In the present embodiment, the joint points C1, C2 between the upper projecting portions 33a, 33b and the lower projecting portions 34a, 34b are disposed on the strong axis PA1 of the principal axes of a section.

The vehicle wheel 1 according to the first embodiment of the present invention is basically configured as above. Next, operation and advantageous effects of the vehicle wheel 1 are described.

In the present embodiment, the joint points C1, C2 of the upper projecting portions 33a, 33b and the lower projecting portions 34a, 34b are disposed on the strong axis PA1 of the principal axes of a section. This reduces stress at the joint points C1, C2, and thus favorably avoids concentration of stress at the joint portions 33 including the joint points C1, C2.

In addition, by eliminating the concentration of stress inside the sub-air chamber SC, the present embodiment can improve strength and durability against the maximum centrifugal force. Further, since the surface rigidity of the upper surface portion 25a improves, sound deadening performance improves. The present embodiment can thus achieve balance between durability performance and sound deadening performance and also can improve both of these performances.

Next, a description is given of a vehicle wheel 10a according to a second embodiment of the present invention.

Figure 4:
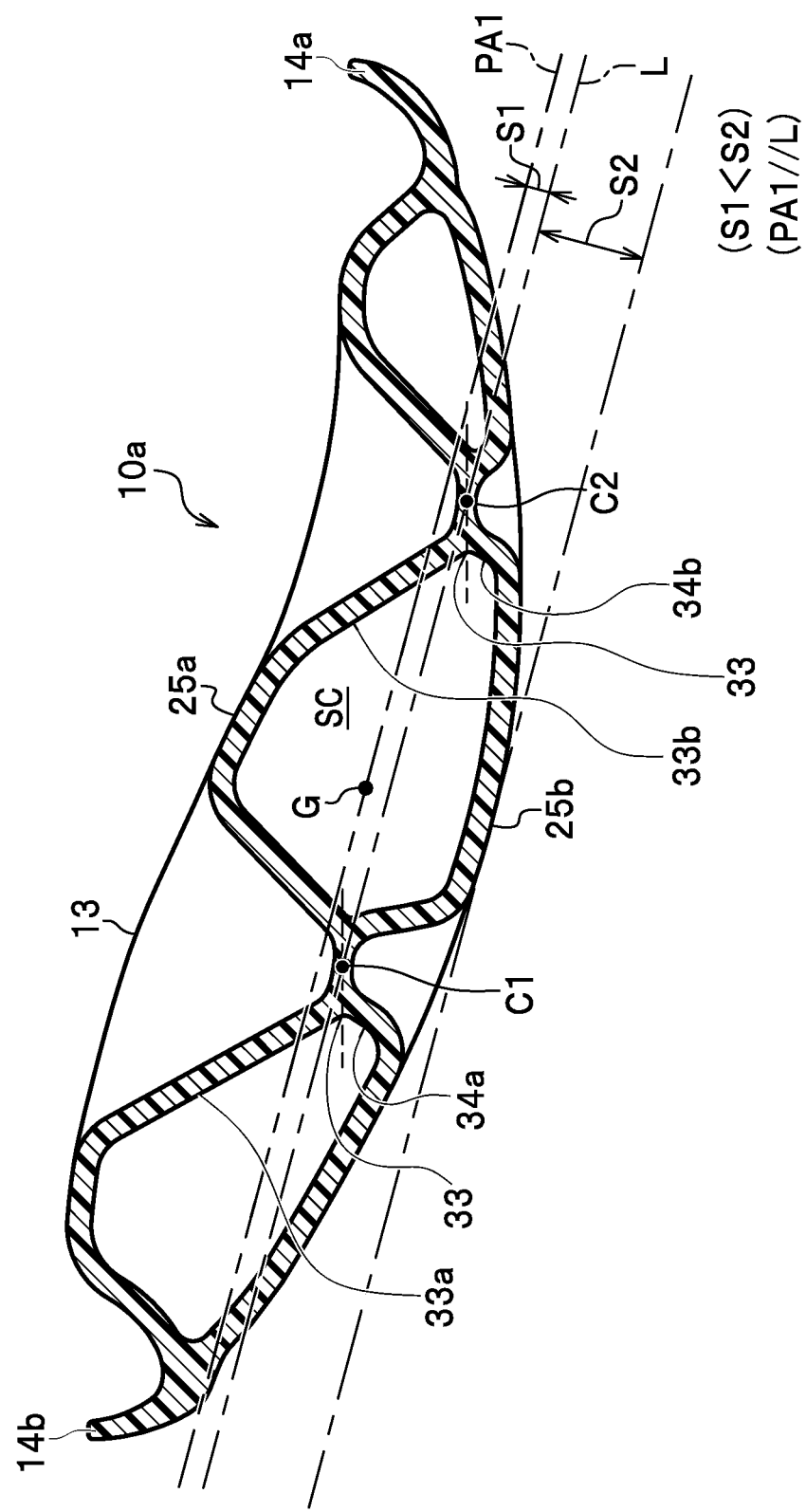
FIG. 4 is a main-part-enlarged sectional view of a sub-air chamber member incorporated in a vehicle wheel according to a second embodiment.

FIG. 4 is a main-part-enlarged sectional view of a sub-air chamber member incorporated in the vehicle wheel according to the second embodiment. Note that, from the second embodiments onwards, the same constituents as those in the first embodiment are denoted by the same reference numerals as used in the first embodiment, and are not described in detail.

The sub-air chamber member 10a of the present embodiment is characterized in that on an axially perpendicular section of the sub-air chamber member 10, a gap distance S1 from the joint points C1, C2 of the joint portions 33 to the strong axis PA1 of the principal axes of a section is shorter than a gap distance S2 from the lower surface portion 25b to the joint points C1, C2 of the joint portions 33 (S1<S2).

Specifically, in the present embodiment, unlike the first embodiment, the joint points C1, C2 of the joint portions 33 are not situated on the strong axis PA1 of the principal axes of a section, but the gap distance S1 from the joint points C1, C2 of the joint portions 33 to the strong axis PA1 of the principal axes of a section is shorter than the gap distance S2 from the lower surface portion 25b to the joint points C1, C2 of the joint portions 33 (S1<S2). In other words, the joint points C1, C2 of the joint portions 33 are disposed closer to the strong axis PA1 of the principal axes of a section than to the lower surface portion 25b.

Thus, the present embodiment can favorably avoid concentration of stress at the joint portions 33 including the joint points C1, C2.

Next, a description is given of a vehicle wheel according to a third embodiment of the present invention.

Figure 5:
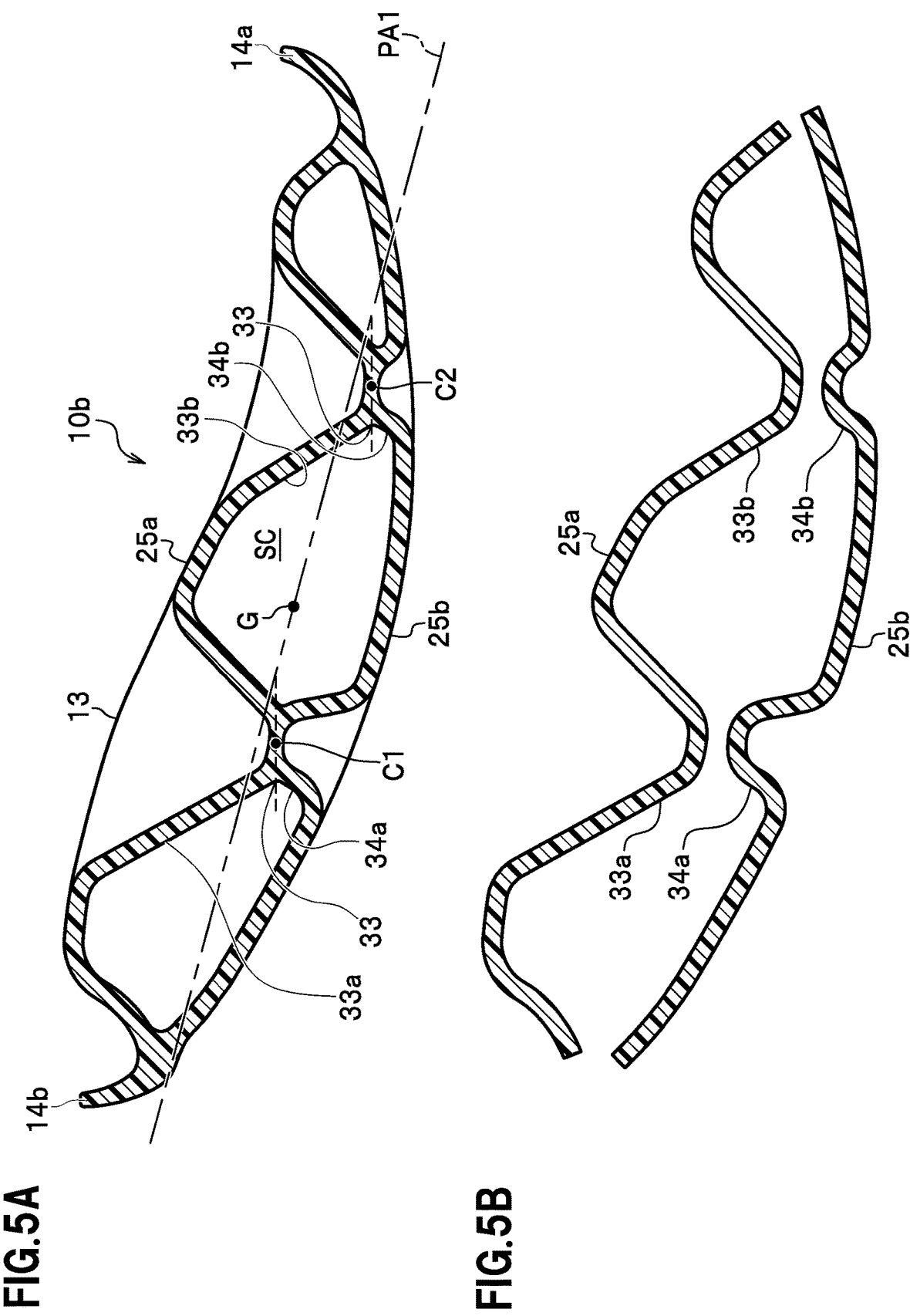
FIG. 5A is a main-part-enlarged sectional view of a sub-air chamber member incorporated in a vehicle wheel according to a third embodiment.
FIG. 5B is a schematic sectional view of an upper surface portion and a lower surface portion shown in FIG. 5A separately illustrated.

FIG. 5A is a main-part-enlarged sectional view of a sub-air chamber member incorporated in the vehicle wheel according to the third embodiment, and FIG. 5B is a schematic sectional view of an upper surface portion and a lower surface portion shown in FIG. 5A illustrated separately.

A sub-air chamber member 10b of the present embodiment is characterized in that on an axially perpendicular section, the product of the mass of the upper surface portion 25a and a radius distance is substantially the same as the product of the mass of the lower surface portion 25b and the radius distance. Specifically, on an axially perpendicular section of the sub-air chamber member 10b, the product of the mass of the upper surface portion 25a from the first edge portion 14a to the second edge portion 14b including the joint portions 33 and the distance from the tire center O (see FIG. 1) to the barycenter G in the radius direction is substantially the same as the product of the mass of the lower surface portion 25b from the first edge portion 14a to the second edge portion 14b including the joint portions 33 and the distance from the tire center O (see FIG. 1) to the barycenter G in the radius direction.

In the present embodiment, the distribution of mass of the upper surface portion 25a including the joint portions 33 with respect to centrifugal force is substantially the same as that of the lower surface portion 25b including the joint portions 33 with respect to centrifugal force. Thus, centrifugal forces produced on the upper surface portion 25a and the lower surface portion 25b when centrifugal force acts on the sub-air chamber member 10b are substantially the same. As a result, the amounts of displacement of the upper surface portion 25a and the lower surface portion 25b due to centrifugal force produced are substantially the same, and the present embodiment can reduce stress produced on the joint portions 33 including the joint points C1, C2 and avoid stress concentration.

Although the difference in mass between an upper half and a lower half of a section which are divided at the joint points C1, C2 of the joint portions 33 is minimized in the present embodiment, the present invention is not limited to this. For example, if the joint points C1, C2 of the joint portions 33 are not situated on the strong axis PA1 of the principal axes of a section, the difference in mass between an upper half and a lower half of a section which are divided at the strong axis PA1 of the principal axes of a section may be minimized.

Figure 6:
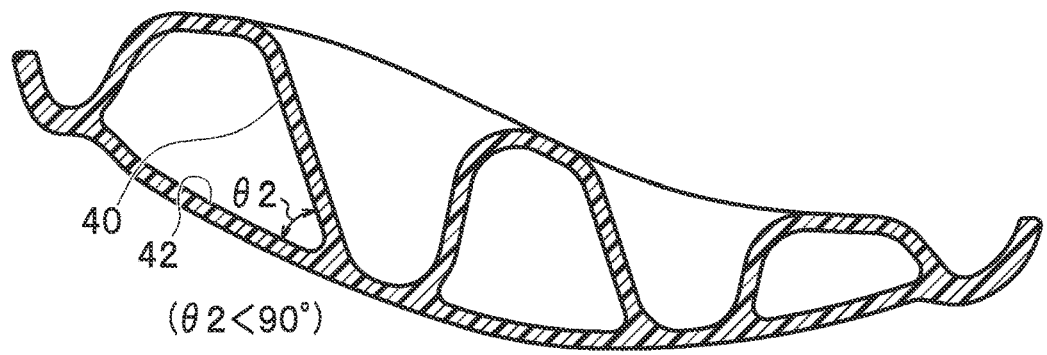
FIG. 6 is a schematic sectional view illustrating a sub-air chamber member of Comparative Example 1.
Figure 7:
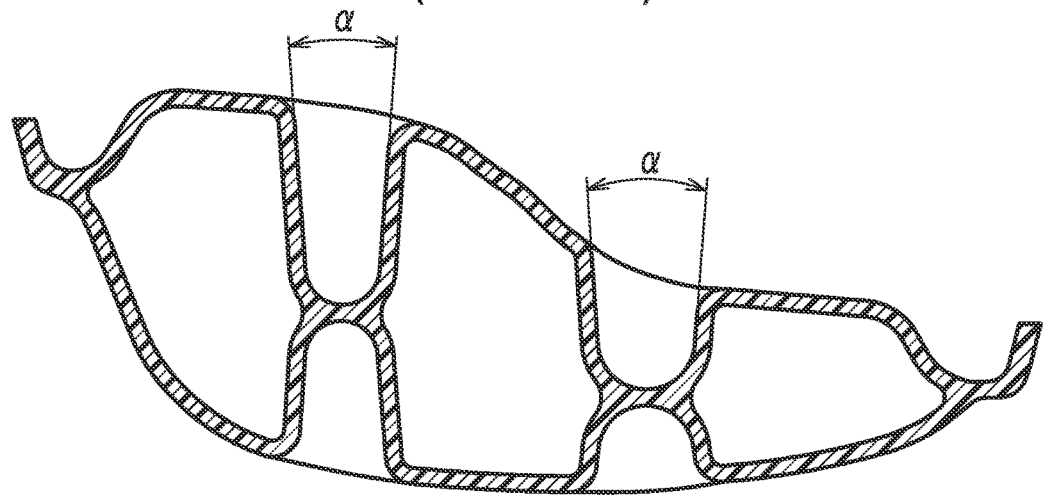
FIG. 7 is a schematic sectional view illustrating a sub-air chamber member of Comparative Example 2.
Figure 8:
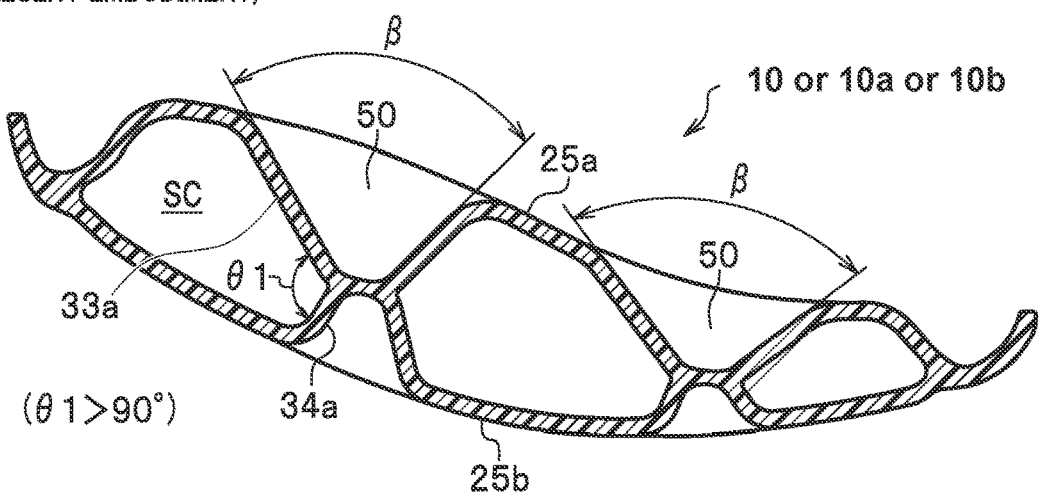
FIG. 8 is a schematic sectional view illustrating the present embodiment.

FIG. 6 is a schematic sectional view illustrating a sub-air chamber member of Comparative Example 1, FIG. 7 is a schematic sectional view illustrating a sub-air chamber member of Comparative Example 2, and FIG. 8 is a schematic sectional view illustrating the present embodiment.

For example, in Comparative Example 1 illustrated in FIG. 6, an angle of intersection θ2 of the site where a side wall 40 of the joint portion is joined to a lower surface portion is an acute angle (θ2<90°). Thus, stress tends to concentrate at the joint site in Comparative Example 1. By contrast, in the present embodiment as illustrated in FIG. 8, an angle of intersection θ1 of the joint site of the upper projecting portion 33a and the lower projecting portion 34a facing the sub-air chamber SC is an obtuse angle (θ1>90°). Thereby, the present embodiment can mitigate concentration of stress at the joint portions 33.

Further, in the present embodiment, when the sub-air chamber member 10, 10a, 10b is injection-molded with a mold (not shown), a stamping gradient β at the sectional joint portion is made larger than a regular stamping gradient α (see FIG. 7) (α<β) to forma fan-like shape 50 illustrated in FIG. 8. Thereby, the surface rigidity of the upper surface portion 25a can be improved.

The invention claimed is:

1. A vehicle wheel having a sub-air chamber member as a Helmholtz resonator attached to an outer circumferential surface of a well portion, wherein
the sub-air chamber member comprises
a lower surface portion disposed at the outer circumferential surface side of the well portion,
an upper surface portion disposed radially outward of the lower surface portion,
a sub-air chamber formed between the upper surface portion and the lower surface portion,
a first edge portion and a second edge portion that connect the lower surface portion and the upper surface portion to each other at respective two sides in a width direction and engage with the well portion, and
a plurality of joint portions that join the upper surface portion and the lower surface portion to each other partially by being recessed toward an inside of the sub-air chamber from the upper surface portion and the lower surface portion between the first edge portion and the second edge portion in the wheel width direction, and
on an axially perpendicular section of the sub-air chamber member, joint points of the joint portions are disposed on a strong axis of principal axes of the section, principal axes including the strong axis and a weak axis, wherein the strong axis has a maximum second moment of area and the weak axis has a minimum second moment of area.

2. A vehicle wheel having a sub-air chamber member as a Helmholtz resonator attached to an outer circumferential surface of a well portion, wherein
the sub-air chamber member comprises
a lower surface portion disposed at the outer circumferential surface side of the well portion,
an upper surface portion disposed radially outward of the lower surface portion,
a sub-air chamber formed between the upper surface portion and the lower surface portion,
a first edge portion and a second edge portion that connect the lower surface portion and the upper surface portion to each other at respective sides in a width direction and engage with the well portion, and
a plurality of joint portions that join the upper surface portion and the lower surface portion to each other partially by being recessed toward an inside of the sub-air chamber from the upper surface portion and the lower surface portion between the first edge portion and the second edge portion in the wheel width direction, and
on an axially perpendicular section of the sub-air chamber member, a gap distance from joint points of the joint portions to a strong axis of principal axes of the section is shorter than a gap distance from the lower surface portion to the joint points of the joint portions, principal axes including the strong axis and a weak axis, wherein the strong axis has a maximum second moment of area and the weak axis has a minimum second moment of area.

3. A vehicle wheel having a sub-air chamber member as a Helmholtz resonator attached to an outer circumferential surface of a well portion, wherein
the sub-air chamber member comprises
a lower surface portion disposed at the outer circumferential surface side of the well portion,
an upper surface portion disposed radially outward of the lower surface portion,
a sub-air chamber formed between the upper surface portion and the lower surface portion,
a first edge portion and a second edge portion that connect the lower surface portion and the upper surface portion to each other at respective sides in a width direction and engage with the well portion, and
a plurality of joint portions that join the upper surface portion and the lower surface portion to each other partially by being recessed toward an inside of the sub-air chamber from the upper surface portion and the lower surface portion between the first edge portion and the second edge portion in the wheel width direction, and
a product of a mass of the upper surface portion including the joint portions between the first edge portion and the second edge portion and a distance in a radius direction from a center of a tire to a barycenter of an axially perpendicular section of the sub-air chamber member is substantially the same as a product of a mass of the lower surface portion including the joint portions between the first edge portion and the second edge portion and the distance in the radius direction from the center of the tire to the barycenter of the axially perpendicular section.

* * * * *